Oct. 8, 1935.  J. E. MARBLE  2,016,968

MASONRY JOINT

Filed April 11, 1932

JAMES E. MARBLE
INVENTOR

BY *Victor J. Evans & Co.*
ATTORNEY

WITNESS:
*A. J. Mank*

Patented Oct. 8, 1935

2,016,968

UNITED STATES PATENT OFFICE 2,016,968

MASONRY JOINT

James E. Marble, Delawanna, N. J.

Application April 11, 1932, Serial No. 604,613

3 Claims. (Cl. 72—106)

This invention relates to means for preventing erosion and deterioration of the bonding material employed in masonry joints and for preventing also the consequent damage resulting from such erosion and deterioration.

The bonding material, particularly that of the cement type now frequently required by building laws, quickly deteriorates and is eroded due to weathering agencies, such for example as, sunlight, water, heat and freezing temperatures or combinations of the same. This alteration or breaking down and wasting of the bonding material permits water to enter buildings to the damage of the same. According to my invention I provide means for preventing the alteration and wasting of the bonding material by employing a guard partly embedded in the bonding material and having a head portion protecting the outer surface of the same and preferably overlapping on adjacent building units held by the bonding material, the latter preferably being of the type which remains sufficiently plastic at all temperatures to allow for the expansion and contraction of building units without resulting in cracks, such material being known in the art. The guard of my invention is preferably but not necessarily made of lead, but it may also be made of other materials, it being desirable however that such materials be corrosion-resisting and of a more or less high degree of malleability so that it may be readily made to conform to the building units adjacent the bonding material in which part of the guard is embedded. I have also provided, in the construction of my guard, means for securely retaining the guard in place.

The plastic bonding materials or joint fillers now used, employ in their composition oils, gums, resins, bitumens, etc., which substances are deteriorated by sunlight, and exposure to air and other elements, and while such fillers or bonding materials have valuable characteristics, I have found that it is necessary to protect them from the sunlight and elements and therefore the guard of my invention is preferably opaque.
The invention will be fully and comprehensively understood from a consideration of the following detailed description when read in connection with the accompanying drawing which forms part of the application with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claims.

Figure 1:
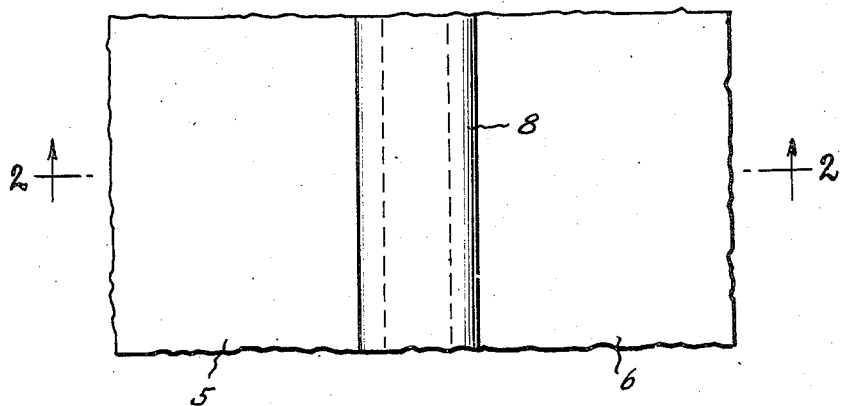
Fig. 1 is a fragmentary plan view of adjacent units of coping bonded in any usual or preferred 5 manner and protected by an embodiment of my invention.

Referring to the drawing for a more detailed description thereof, coping units 5 and 6 are joined by a bonding material 7, which is preferably of the plastic type mentioned above. The guard illustrated comprises a head 8 and a web 9 which is embedded in the bonding material, the head extending transversely beyond the bonding material onto the coping units. The guard is preferably of lead but may be made of any other suitable material, as explained above. The free end portion of the web 9 is enlarged in cross sectional triangular formation providing retaining shoulders 10 to securely hold the guard in position, it being understood however that any other suitable retaining means, such for example as, ridges, irregularities or other protections may be used as retaining means. The shape of the enlarged free end portion of the guard facilitates penetration of the guard into the bonding material as will be apparent upon inspection of Figure 2.

Figure 2:
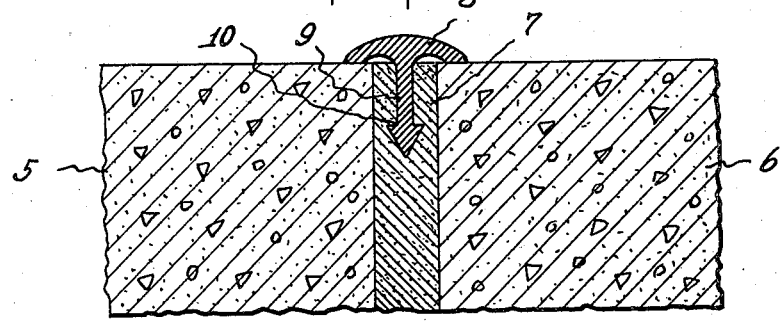
Fig. 2 is a section taken on line 2—2 of Fig. 1.
Figure 4:
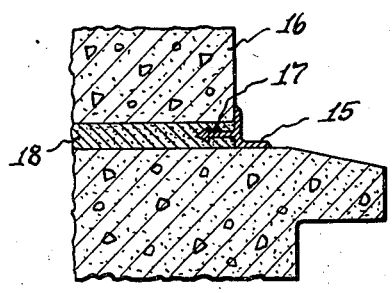
Fig. 4 is a fragmentary vertical section of a masonry structure in combination with another form of my invention.
Figure 3:
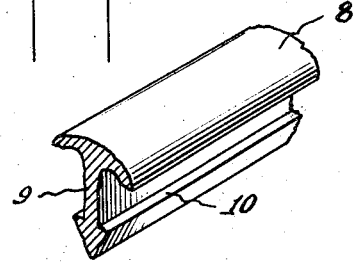
Fig. 3 is a fragmentary perspective view of a guard constructed in accordance with my invention and shown in Figs. 1 and 2.

In Fig. 4 I show a modification of my invention in which the guard 15 is positioned on a vertical wall 16 and has a part 17 extending into the bonding material 18, the guard in cross-section including an angular po. tion and a penetrating portion, the latter being similar in form to the corresponding portion of that embodiment of my invention shown in Figs. 1, 2, and 3.

What is claimed is:

1. The combination, with spaced adjacent building blocks subject to expansion and contraction, of bonding material subject to deterioration by light, air and weather elements filling the space between said blocks and remaining sufficiently plastic to allow for expansion and contraction of the blocks, and a guard of strip formation, said guard having a head portion overlapping said blocks and covering the interior surface of said material and a web portion extending into the material, means for anchoring the web portion therein, and the thickness of said web portion and anchoring means being less than the space between said blocks to allow expansion and contraction of the latter and said bonding material.

2. The combination, with spaced adjacent building blocks subject to expansion and contraction, of bonding material filling the space between said blocks and of a character to expand and contract therewith, and an opaque guard of strip formation, said guard having a head portion overlapping said blocks and covering the exterior surface of said material and a web portion extending into said material, shouldered penetrating means formed on the web portion to anchor the guard in said material, and the thickness of said web portion and the shouldered penetrating means being less than the space between said blocks to allow expansion and contraction of the latter and said bonding material.

3. The combination, with spaced adjacent building blocks subject to expansion and contraction, of bonding material filling the space between said blocks and of a character to expand and contract therewith, and an opaque guard of strip formation, said guard having a head portion overlapping said blocks and covering the exterior surface of said material and a web portion extending into the material, cross sectional triangular shaped penetrating means on the web and forming shoulders providing anchoring means and the thickness of said web portion and the shouldered penetrating means being less than the space between said blocks to allow expansion and contraction of the latter and said bonding material.

JAMES E. MARBLE.